United States Patent [19]
Fox et al.

[11] 4,358,568
[45] Nov. 9, 1982

[54] COPOLYMERS OF POLYARYLATES WITH POLYETHYLENE ARYLATES AND PROCESS FOR THEIR PREPARATION

[75] Inventors: Daniel W. Fox; Bruce A. Kaduk; John B. Starr, Jr., all of Pittsfield, Mass.

[73] Assignee: General Electric Company, Pittsfield, Mass.

[21] Appl. No.: 187,768

[22] Filed: Sep. 16, 1980

[51] Int. Cl.$^3$ .................... C08L 67/02; C08L 69/00
[52] U.S. Cl. .................................. 525/439; 525/444; 525/448
[58] Field of Search ................... 525/439, 444, 448

[56] References Cited

U.S. PATENT DOCUMENTS 3,299,172  1/1967  Schade et al. .................... 525/444
3,413,379  11/1968  Schade et al. .................... 525/444

Primary Examiner—J. Ziegler
Attorney, Agent, or Firm—Hedman, Casella, Gibson & Costigan

[57] ABSTRACT

Novel copolymers are prepared by the interaction of low or high molecular weight polyarylates, such as bisphenol A-isophthalate-terephthalate polyarylates, or bisphenol A-isophthalate-terephthalate-carbonate polyarylates and a high molecular weight diprimary dialcohol polyester polymer, such as polyethylene terephthalate polymer. The resulting copolymers are transparent and tough. They maintain their dimensional stability over a wide range of temperature from 75°–175° C., are soluble in chlorinated solvents, and have one glass transition point.

4 Claims, No Drawings

COPOLYMERS OF POLYARYLATES WITH POLYETHYLENE ARYLATES AND PROCESS FOR THEIR PREPARATION

BACKGROUND OF THE INVENTION

The invention relates to novel copolymers prepared by the interaction of a melt mix of a high molecular polyarylate, or a low molecular weight polyarylate of, for example, bisphenol A-isophthalate-terephthalate polyarylate, or bisphenol A-isophthalate-terephthalate-carbonate polyarylate and a high molecular weight diprimary dialcohol polyester polymer, such as polyethylene arylate, and to the process for their manufacture.

In order to produce polyarylates of high molecular weights temperatures of 300° C. or more are normally required. The problem is that at this range, thermal degradation and discoloration occurs. The process of the subject invention minimizes the polymerizing temperature and also produces novel copolymers which are transparent, tough, maintain dimensional stability, and are not discolored. They are completely soluble in chloroform and have a single glass transition temperature.

It has been proposed to prepare mixed polyesters having a softening temperature above 100° C.: U.S. Pat. No. 3,299,172 granted Jan. 17, 1967 and U.S. Pat. No. 3,413,379 granted Nov. 26, 1968. In these prior patents a mixture of diphenyl isophthalate, diphenyl terephthalate, diphenyl carbonate and bisphenol A are disclosed in the Examples as being reacted until the mixture reaches a value of 2,000 to 4,000 poises. At this point there is added to this mixture a polyester of a diprimary dihydric alcohol and terephthalic or isophthalic acid.

In U.S. Pat. No. 3,299,172 it is stated, column 3, lines 16 and 17 that the products obtained are opaque and generally faintly yellowish colored masses. In Example 1, it is stated that the product was faintly yellowish in color, and had a slightly milky appearance (Col. 4, lines 8-9). It is also stated that in hot chloroform, a portion of the polyester product went into solution, while a swelled residue thereof remained undissolved (Col. 3, lines 10-12). Turbidity of the resulting product and its yellow coloration are also mentioned in other of the examples.

In U.S. Pat. No. 3,413,379 it is stated that: "Thus, the invention herein constitutes the use of certain low molecular weight polyesters, i.e., those having a viscosity number of between about 0.1 and 0.5 dl./g. as an additive to the reaction mixture of diaryl terephthalate and/or diaryl isophthalate with dihydric phenols at a specified point during the course of the reaction." Col. 3, lines 36-44.

On the other hand, the products obtained in accordance with the subject invention are copolymers of bisphenol A-isophthalate-terephthalate polyarylates or bisphenol A-isophthalate-terephthalate-carbonate polyarylates and a high molecular weight diprimary alcohol polyester polymer, such as, polyethylene arylate, and preferably, polyethylene terephthalate, having a high molecular weight as determined by measuring their intrinsic viscosity.

In the subject invention, polyarylate-polyethylene terephthalate polymers, are transparent, and tough. They have higher use temperatures than polyethylene terephthalate and are capable of maintaining dimensional stability over a wide range of temperature, namely, covering the range from 75°-175° C. They are completely soluble in chlorinated solvents such as chloroform and have a single glass transition point or temperature. They are useful as molding compounds, for manufacturing films, food containers and as glazing, and production of extruded shapes.

DESCRIPTION OF THE INVENTION

It has been found that melt mixtures of high molecular weight polyethylene arylates, as for example, polyethylene terephthalate, with either low or high molecular weight polyarylates, which yield inhomogeneous mixtures which are can be separated and have distinctive properties characteristic of each constituent polymer can be homogenized to a common copolymer by subjecting them to heat and stirring under an inert atmosphere such as nitrogen or vacuum. The vacuum treatment will simultaneously result in building or increasing the molecular weight of the copolymers as determined by measuring their intrinsic viscosities (IV).

According to the subject process a melt mix of high molecular weight polyethylene arylate and high or low molecular weight polyarylate is prepared by extrusion through a simple extruder to yield an intimate blend of the two polymers. The blend has two glass transition temperatures (Tg's). The extruded material which shows a tendency to crystallize is a semi-incompatible mixture with a portion being soluble in chlorinated solvents such as chloroform, and the polyethylene arylate portion being insoluble.

When the extruded material is heated to a temperature of from about 265°-270° C., under a vacuum of less than 1 mm. mercury for about one hour the resulting product has gained in molecular weight as determined by measuring its intrinsic viscosity. It now exhibits only one Tg between the respective Tg's of the two components of the mixture. It no longer has a tendency to crystallize. It is soluble in chlorinated solvents, such as chloroform, and, it is not separated into its two components. The novel copolymers thus produced possess the valuable uses and properties hereinabove mentioned.

In an alternative procedure, blends of high molecular weight polyethylene arylates and low or high polyarylates are homogenized and interpolymerized by heating for approximately one hour at about 265°-270° C., under an inert atmosphere such as nitrogen.

The low or high molecular weight polyarylates which are preferred are bisphenol A-isophthalate-terephthalate polyarylates which are derived by transesterification and polycondensation of bisphenol A, with diphenyl isophthalate and diphenyl terephthalate, for example, 0.5 mole each of diphenyl isophthalate and diphenyl terephthalate and one mole of bisphenol A.

Also employed are low or high molecular weight polyarylate-carbonates derived by transesterification and polycondensation of bisphenol A, diphenyl terephthalate, diphenyl isophthalate and diphenyl carbonate.

A high molecular weight polyarylate refers to such arylates which have an intrinsic viscosity of at least about 0.5-0.6 dl./g. and a low molecular weight polyarylate refers to such polyarylates that have an intrinsic viscosity of about 0.1 to 0.3 dl./g. High molecular weight polyethylene arylate, as for example polyethylene terephthalate, refers to a polymer having an intrinsic viscosity of at least about 0.5 dl./g., or greater.

In all cases where intrinsic viscosity (IV) is referred to it is measured in a solvent mixture of 60 parts by weight of phenol and 40 parts by weight of tetrachlorethane at 25° C. This particular solvent mixture is necessary for determining the intrinsic viscosity (IV) of polyethylene arylate, alone, or in incompatable blends with polyarylates.

Glass transition temperature is determined, for example, using a Perkin-Elmer DSC-II, and is the inflection point in the differential heat capacity vs. temperature curve.

While the proportion of the components in the mixture being interpolymerized may be varied within a range of 10 percent to 70 percent of the polyethylene arylate to 90 percent to 30 percent of the polyarylate, a preferred range is 25 percent polyethylene terephthalate to 75 percent polyarylate (carbonate).

The subject invention is further described in the Examples which follow. These examples are preferred embodiments and are not to be construed in limitation thereof.

EXAMPLE I

Equal proportions of a high molecular weight bisphenol A-isophthalate-terephthalate polyarylate having an IV of 0.6 dl./g. and high molecular weight polyethylene terephthalate having an IV of 0.7 dl./g. are mixed and extruded through a single screw extruder. The extruded material which has an IV of 0.57 dl./g. shows a tendency to crystallize, is a semi-incompatible mixture with a portion being soluble in chlorinated solvents and a portion, the polyethylene terephthalate, being insoluble. The mixture has two Tg's, one at approximately 89° C. and the other at approximately 188° C.

The extruded material is heated at 270° C. in a stirred reactor under a vacuum of less than one mm. mercury for sixty minutes. The copolymer obtained which shows no tendency to crystallize, has an IV of 0.74 dl./g., is completely soluble in chlorinated solvents, has one Tg at 115° C., and is transparent and tough.

EXAMPLE II

Extruded material as prepared in Example I is heated at 270° C. in a stirred reactor with nitrogen sweep for 60 minutes. The resulting copolymer which shows no tendency to crystallize, has an IV of 0.48 dl./g., is soluble in chlorinated solvents, and has one Tg at 112° C. It is tough and transparent.

EXAMPLE III

Equal proportions of a low molecular weight bisphenol A-terephthalate-isophthalate-carbonate polyarylate having an IV of 0.1 dl./g., derived by transesterification and polycondensation of one mole of bisphenol A, 0.6 mole of diphenyl terephthalate, 0.38 mole of diphenyl isophthalate, and 0.02 mole of diphenyl carbonate, and high molecular weight polyethylene terephthalate having an IV of 0.7 dl./g. are mixed and extruded through a single screw extruder. The extruded material is stirred in a reactor at 270° C. under a vacuum of less than one mm. mercury for 60 minutes. The copolymer thus obtained shows no tendency to crystallize. It has an IV of 0.45 dl./g., is completely soluble in chlorinated solvents and has one Tg at 108° C. It is tough and transparent.

EXAMPLE IV

Extruded material as prepared in Example III is mixed in a stirred reactor at 265° C. under nitrogen sweep for 60 minutes. The copolymer thus obtained shows no tendency to crystallize. It has an IV of 0.30 dl./g., is completely soluble in chlorinated solvents and has one Tg at 105° C. It is transparent, but not tough.

When equal porportions of the bisphenol A-terephthalate-isophthalate-carbonate polyarylate and polyethylene terephthalate of Examples III and IV are mixed and extruded, the extruded material has a tendency to crystallize. It is a semi-incompatible mixture with a portion being soluble in chlorinated solvents and a portion, the polyethylene terephthalate being insoluble. The mixture has two Tg's one at 85° C. and the other at 165° C.

The foregoing detailed description will suggest many variations to those skilled in this art. All such variations are within the full scope of the appended claims.

We claim:

1. A process for the preparation of a copolymer which comprises reacting at a temperature of about 265°–270° C. for a period of about 60 minutes under a vacuum of less than one mm. mercury, or under an inert atmosphere, a mixture of (1) a high molecular weight polyethylene arylate having an intrinsic viscosity of at least about 0.5 dl/g and (2) a low or high molecular weight bisphenol A-isophthalate-terephthalate polyarylate or bisphenol A-isophthalate-terephthalate-carbonate polyarylate, said low molecular weight polyarylate having an intrinsic viscosity of about 0.1–0.3 dl/g and said high molecular weight polyarylate having an intrinsic viscosity of at least about 0.5–0.6 dl/g, in the proportion of 10 percent to 70 percent of (1) to 90 percent to 30 percent of (2), the resulting polymer being transparent, tough, soluble in chlorinated solvents, capable of maintaining its dimensional stability over a wide range of temperatures, and possessing a single glass transition temperature said intrinsic viscosity being as measured in a 60:40 mixture of phenol and tetrachloroethane at 25° C.

2. A process according to claim 1, wherein the polyethylene arylate is a high molecular weight polyethylene terephthalate.

3. A process according to claim 1, wherein the bisphenol A-isophthalate-terephthalate is derived from one mole of bisphenol A and 0.5 mole each of diphenyl isophthalate and diphenyl terephthalate.

4. A process according to claim 1, wherein the bisphenol A-isophthalate-terephthalate-carbonate polyarylate is derived from one mole of bisphenol A, 0.6 mole of diphenyl terephthalate, 0.38 mole of diphenyl isophthalate, and 0.02 mole of diphenyl carbonate.

* * * * *